Dec. 6, 1938. H. J. WOODALL Re. 20,943

AUTOMOBILE TRIM PANEL

Original Filed Feb. 5, 1934

INVENTOR.
Herbert J. Woodall
BY
Parker & Burton
ATTORNEYS.

Reissued Dec. 6, 1938

Re. 20,943

UNITED STATES PATENT OFFICE 20,943

AUTOMOBILE TRIM PANEL

Herbert J. Woodall, Detroit, Mich., assignor to Woodall Industries Incorporated, Detroit, Mich., a corporation of Michigan Original No. 1,999,385, dated April 30, 1935, Serial No. 709,783, February 5, 1934. Application for reissue April 16, 1936, Serial No. 74,795

18 Claims. (Cl. 154—46)

My invention relates to improvements in upholstery trim panels and to those particularly intended for use in the interior of automobile bodies.

An object is to provide a trim panel which possesses the same appearance as an expensive upholstered trim panel yet which may be easily fabricated at a low cost. My improved panel is durable and of a substantial construction. It is a uniformly homogeneous structure. It is self-supporting. It includes a rigid foundation board provided with a layer of cushioning material covered with suitable trim fabric. The finished surface is decoratively embossed.

It has previously been the practice in the fabrication of panels of this general character to secure suitable upholstery cloth over a foundation panel board with a layer of wadding or the like interposed between the cloth and the board and to provide a design outlined in the upholstery cloth by stitching the cloth to the board through the wadding holding the upholstery cloth and wadding toward the board along the line of the stitching.

In my improved panel I propose to employ, in place of the conventional wadding heretofore used, material of the character described in my patent, No. 1,999,383, issued April 30, 1935, which material is used as a wadding between the foundation or panel board and the upholstery fabric. This material is a relatively loosely integrated fibrous material having particles of a thermoplastic binder, such as a suitable latex compound, interspersed therethrough, whereby upon compression under heat it will compact along the line of compression and retain the densification given to it. Over areas where the material has not been so compressed it will retain its normal expanded condition and present the appearance of soft, cushioning material. This material is interposed as a wadding between the foundation board and the upholstery cloth.

The several layers are adhesively secured together as described in such patent, No. 1,999,383. The laminated structure is then subjected to the stamping operation which presses the loosely integrated material along predetermined lines outlining the particular decorative design. The loosely integrated fibrous material retains its compression along said predetermined lines of densification maintaining said design.

A specific object of this invention is to provide such a laminated construction wherein this loosely integrated fibrous thermoplastic material is protected against undesirable deformation by accident and wherein the intended embossed appearance is preserved throughout the life of the patent. This result is accomplished by providing a layer of tough, pliable, flexible material adhesively secured underneath the layer of upholstery cloth over the layer of loosely integrated thermoplastic wadding. It has a tendency to maintain the normal intended appearance of the upholstered panel and protect the wadding from permanent accidental deformation through impact or accidental application of localized pressures thereagainst.

The particular construction through which this is accomplished will more fully appear from the following description, appended claims and accompanying drawing, wherein:

Figure 1:
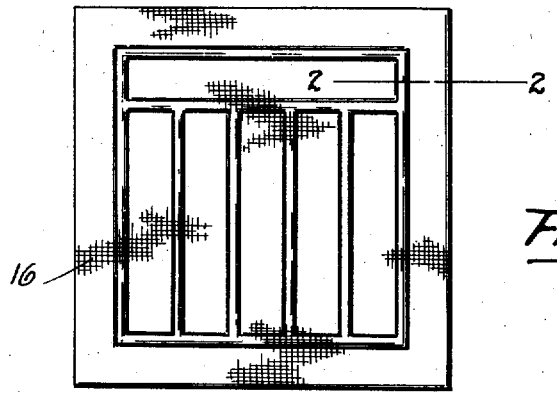
Figure 1 is an elevation of a trim panel embodying my invention.

In the several figures of the drawing the panel is shown as embodying a foundation board 10 which may be formed of any suitable composition fiber board of which many are available for use. If desired this panel board may be of a waterproof character and be composed of cellulose fibers held together by an asphalt compound, the board being compressed so that it is rigid and self-supporting. This board is cut to size and there is spread over one surface thereof a lamination or layer of loosely integrated fibrous material 12 which may consist of a multiplicity of film-like layers of cellulose material of a character so fine and filmy as to almost resemble cobwebs. A multiplicity of these layers are superimposed. Each of the several layers carry asphalt particles interspersed therethrough. They are sufficiently compacted so as to form an integral structure but they present a very loosely integrated layer of wadding or cushioning material. This layer will upon being subjected to heat and pressure tend to retain its compressed densified shape that it is given during the compression. This layer is adhesively secured by a suitable adhesive over one surface of the foundation board 10.

I then provide a layer which consists of a tough flexible pliable sheet of material. Different types of material are available for this use. Certain of these materials are formed of a compound consisting of paper impregnated with latex and suitably treated. It then constitutes a sheet of tough, flexible, pliable material which almost resembles rawhide. It is exceedingly tough and strong. It is quite flexible. Such a layer of material indicated as 14 is adhesively secured to the layer 12.

There is then adhesively secured to the layer 14 a covering of upholstery fabric of any suitable nature such as woven fabric or any other suitable material This is indicated in the drawing as 16. These several laminations are adhesively secured together. The upholstery fabric is carried over the edges as at 18 in the approved manner. The entire panel is then subjected to a stamping operation in a die stamping machine and is given any desired embossed configuration. A conventional design is shown in Fig. 1.

Figure 2:
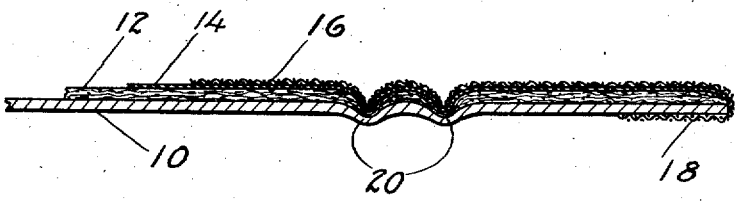
Fig. 2 is a cross-sectional view taken on line 2—2 of Fig. 1.
Figure 3:
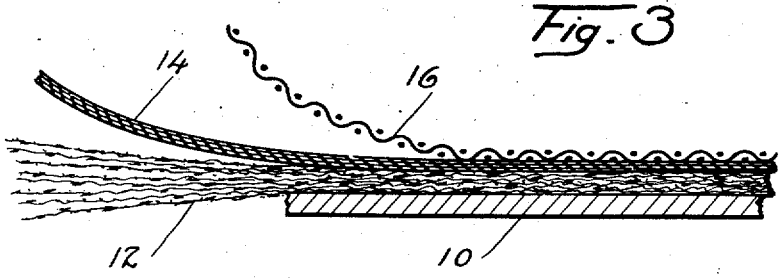
Fig. 3 is a sectional view through the panel during its process of fabrication and prior to the stamping of the embossed design thereon.

Along the lines of compression the heat and pressure of the die, the die being heated to a point sufficient to act upon the asphalt particles, the layer 12 is compressed and densified as shown in Fig. 2 at 20. It retains this densification upon removal of the complete layer from the press. The die is formed as described in my Patent No. 1,999,383 so that the layer 12 is not compressed at points except those intended for compression to form the design, and the complete panel presents the appearance shown in Fig. 1.

It has been found, in using panels which include the layer 12 but without the layer 14 here provided, the panels being subjected to pressure at localized points, that accidental deformation of the layer 12 results and that this deformation persists and mars the appearance of the panel. To eliminate this accidental undesirable permanent deformation and to render the same purely temporary in its effect, the layer 14 is provided. The layer 14 protects the layer 12 and serves to prevent it from permanently responding to these accidental deformations. It serves to hold it at its normal expanded shape except along the lines where it is subjected to pressure in the press. It not only resiliently resists such deformation but neutralizes its effect by causing the laminated structure to re-assume its original shape.

What I claim:

1. A trim panel comprising a self-supporting foundation board, a layer of non-self-supporting soft fibrous material possessing thermoplastic characteristics adhesively secured thereto, a lamination of tough flexible resilient material adhesively secured over said soft fibrous material and suitable upholstery material secured over said last named lamination.

2. A laminated trim panel comprising a foundation board, a lamination of soft compressible fibrous material possessing thermoplastic characteristics secured to said foundation board, a sheet of flexible resilient material adhesively secured to said compressible thermoplastic lamination, said compressible thermoplastic lamination being compacted along a predetermined line against the foundation board holding the resilient sheet with it along said line, said resilient sheet being adapted to protect said compressible thermoplastic lamination against accidental permanent compression.

3. A laminated panel structure comprising a rigid foundation board, a non-rigid lamination of soft compressible cushioning fibrous material possessing thermoplastic characteristics secured to the foundation board, a sheet of tough flexible resilient material adhesively secured to the compressible thermoplastic lamination, said laminated structure being compressed along a predetermined line outlining a design compacting the compressible thermoplastic lamination against the foundation board and holding the resilient sheet along said line thereto, said resilient sheet tending to hold said compressible thermoplastic lamination in its uncompressed state over areas other than along said line of compression.

4. A lamination panel structure comprising, a self-supporting foundation board, a non-self-supporting soft compressible thermoplastic lamination secured thereto, a flexible resilient sheet adhesively secured over said compressible lamination, a lamination of upholstery fabric secured over said resilient sheet, said laminated structure being compacted along a predetermined line outlining an uncompressed area, said thermoplastic lamination being compacted along said line against the foundation board holding the resilient sheet and upholstery cloth therewith along said lines, said resilient sheet tending to hold the thermoplastic lamination in its uncompressed shape throughout said uncompressed area against accidental permanent deformation.

5. A laminated structure comprising a foundation lamination, a resilient lamination of downy fibrous cushioning material secured thereto possessing thermoplastic characteristics, a sheet of tough flexible resilient material adhesively secured over said thermoplastic lamination adapted to prevent permanent accidental localized densifications of the resilient thermoplastic lamination.

6. A laminated structure comprising an internal lamination of springy fibrous cushioning material having thermoplastic particles scattered therethrough, a lamination of tough fibrous protective material secured to opposite sides of the internal lamination, said internal lamination being permanently compacted and densified along a predetermined line holding said two fibrous laminations toward each other along said line.

7. A laminated structure comprising an internal lamination of soft cushioning material consisting of a multiplicity of filmy fibrous layers loosely integrated together and carrying water resistant binder material and arranged between two fibrous laminations secured together at their margins enclosing said internal lamination and each carrying water resistant binder material.

8. A laminated structure comprising an internal lamination of resilient cushioning material consisting of a multiplicity of filmy fibrous layers loosely integrated together having thermoplastic material distributed interiorly therein, two protective laminations arranged on opposite sides of said internal lamination and secured together along a line enclosing an uncompressed area of the internal lamination, said internal lamination being adhesively secured compacted together along said line, each protective lamination being tough, durable, flexible and water resistant.

9. A laminated structure comprising an internal lamination of resilient cushioning material consisting of a multiplicity of filmy fibrous layers loosely integrated together and carrying water resistant thermoplastic binder, two protective laminations arranged on opposite sides of said internal lamination and secured together at their edges enclosing the internal lamination, each protective lamination being tough, durable, and water resistant and at least one of said protective laminations being flexible and resilient.

10. A laminated structure comprising an internal lamination of fluffy fibrous loosely integrated asphalt impregnated material arranged between two laminations of fibrous water resistant material.

11. A laminated structure comprising a lamination of fluffy fibrous loosely integrated asphalt impregnated material associated with a protective lamination of flexible fibrous sheet material impregnated with a water resistant compound.

12. A laminated structure comprising an internal lamination of resilient cushioning material consisting of a multiplicity of filmy fibrous layers loosely integrated together and having thermoplastic material distributed interiorly therein, two protective laminations arranged on opposite sides of said internal lamination and adhesively secured together through the internal lamination along a line enclosing an uncompressed area of the internal lamination, each protective lamination being tough, durable, flexible and water resistant, one protective lamination being formed of relatively rigid supporting foundation board and the other protecting lamination being a latex saturated sheet of material.

13. A laminated panel comprising a self-supporting foundation lamination, a lamination of soft fibrous cushioning material overlying the foundation lamination, a lamination of protective material overlying the cushioning lamination, said cushioning lamination and protective lamination being compacted at selected points against the foundation board and adhesively secured compacted together against the foundation board at said points by adhesive binder carried interiorly by the cushioning lamination and compacted together at said points.

14. A laminated panel comprising a foundation board, a layer of soft fluffy cushioning material having thermoplastic material distributed interiorly therein and overlying one face of the foundation board, a latex saturated flexible sheet overlying the cushioning lamination, a layer of trim material overlying said saturated sheet, said trim material and saturated sheet and cushioning layer being compacted against the foundation board and adhesively secured thereto at a selected point throughout which the cushioning layer is adhesively secured compacted together and against the board.

15. A laminated panel comprising a self-supporting foundation lamination, a lamination of soft cushioning material having thermoplastic material distributed interiorly and overlying the foundation lamination, a lamination of moisture resistant protective material overlying the cushioning lamination, a layer of trim material overlying the protective material, said cushioning lamination, protective lamination, and trim material being compacted throughout a determined area against the foundation board and adhesively secured compacted together and against said board by said thermoplastic material through said cushioning lamination throughout said area.

16. A laminated panel comprising an asphalt impregnated foundation board, a layer of fluffy wadding having thermoplastic material distributed interiorly therein and overlying one surface of the foundation board, said wadding being permanently adhesively compacted along a determined line and adhesively secured compacted together along said line, a layer of trim material overlying the wadding, and a latex saturated sheet interposed as a barrier sheet between the trim material and the asphalt impregnated board.

17. A laminated trim panel comprising a self-supporting foundation lamination, a lamination of soft fibrous cushioning material carrying interiorly distributed thermoplastic material and overlying the foundation lamination, a lamination of protective material overlying the cushioning lamination, said protective lamination and cushioning lamination being compacted together against the foundation lamination along a line defining an uncompacted area, said cushioning lamination being held compacted together along said line by said thermoplastic material and said protective lamination being adhesively secured to the foundation lamination through said compacted cushioning lamination along said line.

18. A laminated panel comprising, in combination, a foundation lamination, a lamination of wadding overlying the foundation lamination, a trim lamination overlying the wadding, said wadding having thermoplastic material distributed interiorly therein and being permanently adhesively compacted along a determined line adhesively securing the trim lamination to the foundation along said line, and a thin form sustaining lamination overlying said wadding underneath said trim lamination adjacent to said compacted line of wadding.

HERBERT J. WOODALL.